United States Patent
Takahashi et al.

(10) Patent No.: US 7,858,237 B2
(45) Date of Patent: *Dec. 28, 2010

(54) NONAQUEOUS ELECTROLYTE SECONDARY BATTERY

(75) Inventors: Yasufumi Takahashi, Kobe (JP); Akira Kinoshita, Kobe (JP); Shingo Tode, Kobe (JP); Kazuhiro Hasegawa, Kobe (JP); Hiroyuki Fujimoto, Kobe (JP); Ikuro Nakane, Kobe (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,301

(22) Filed: Oct. 9, 2009

(65) Prior Publication Data

US 2010/0112450 A1    May 6, 2010

Related U.S. Application Data

(63) Continuation of application No. 10/594,459, filed as application No. PCT/JP2005/003723 on Mar. 4, 2005, now Pat. No. 7,622,223.

(30) Foreign Application Priority Data

Mar. 29, 2004    (JP) .............................. 2004-094475
Nov. 4, 2004    (JP) .............................. 2004-320394

(51) Int. Cl.
*H01M 4/58* (2010.01)

(52) U.S. Cl. .............. 429/231.3; 429/231.1; 429/231.6; 429/231.5; 429/223; 429/224; 429/332

(58) Field of Classification Search .............. 429/231.3, 429/231.1, 231.6, 231.5, 223, 224, 332
See application file for complete search history.

(56) References Cited

U.S. PATENT DOCUMENTS

| | | | | |
|---|---|---|---|---|
| 7,198,871 B2 | 4/2007 | Kitao et al. | .............. | 429/231.3 |
| 7,435,510 B2 | 10/2008 | Tode et al. | .............. | 429/231.3 |
| 7,622,223 B2 * | 11/2009 | Takahashi et al. | .............. | 429/231.3 |
| 2004/0076882 A1 | 4/2004 | Hosoya et al. | .............. | 429/223 |
| 2004/0229123 A1 | 11/2004 | Takahashi et al. | .............. | 429/231.3 |

FOREIGN PATENT DOCUMENTS

| | | |
|---|---|---|
| CN | 1482699 A | 3/2004 |
| CN | 1484336 A | 3/2004 |
| EP | 1 022 792 A1 | 7/2000 |
| EP | 1 391 959 A2 | 2/2004 |
| JP | 2561556 B2 | 9/1996 |
| JP | 3244314 B2 | 10/2001 |
| JP | 2002-42813 A | 2/2002 |
| JP | 2002-319398 A | 10/2002 |
| JP | 2003-203631 A | 7/2003 |
| JP | 2003-221234 A | 8/2003 |
| JP | 2004-31165 A | 1/2004 |
| JP | 2004-47180 A | 2/2004 |
| JP | 2004-047437 | 2/2004 |
| JP | 2004-139743 | 5/2004 |
| JP | 2005-129489 A | 5/2005 |

OTHER PUBLICATIONS

Yoshio, Masaki et al., "Preparation and properties of $LiCo_yMn_xNi_{1-x-y}O_2$ as a cathode for lithium ion batteries", *Journal of Power Sources*, 90 (2000) pp. 176-181.
Lu, Zhonghua et al., "Layered $Li[Ni_xCo_{1-2x}Mn_x]O_2$ Cathode Materials for Lithium-Ion Batteries", *Electrochemical and Solid-State Letters*, 4 (12) pp. A200-A203 (2001).
Koyama, Yukinori et al., "Lithium Insertion Material of $LiCo_{1/3}Ni_{1/3}Mn_{1/3}O_2$ for Advanced Batteries; (I) Prediction on the Crystal and Electronic Structure", *The 42nd Battery Symposium in Japan: Lecture Summary*, 2001, pp. 50-51.
Supplementary European Search Report issued on May 3, 2010, in European Patent Application No. 05719995.2-2119.
Mladenov, M et al., "Effect of Mg doping and MgO-surface modification on the cycling stability of $LiCoO_2$ electrodes" Electrochemistry Communictions, vol. 3, pp. 410-416, 2001.

\* cited by examiner

*Primary Examiner*—Laura S Weiner
(74) *Attorney, Agent, or Firm*—Kubovcik & Kubovcik

(57) ABSTRACT

A nonaqueous electrolyte secondary battery includes a positive electrode containing a positive active material, a negative electrode containing a negative active material and a nonaqueous electrolyte. Characteristically, the positive active material comprises a mixture of a lithium transition metal complex oxide A obtained by incorporating at least Zr and Mg into $LiCoO_2$ and a lithium transition metal complex oxide B having a layered structure and containing at least Ni and Mn as the transition metal.

17 Claims, 4 Drawing Sheets

[FIG. 1]
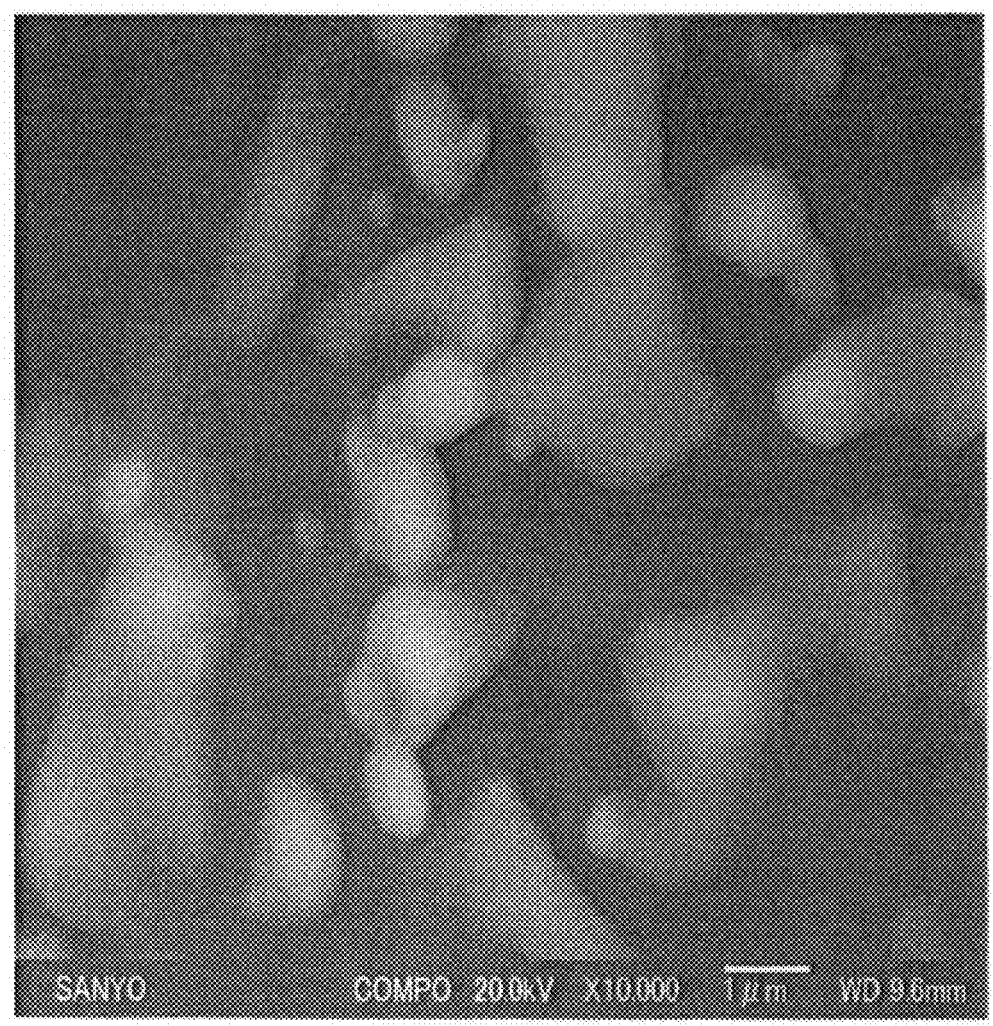

[FIG. 2]
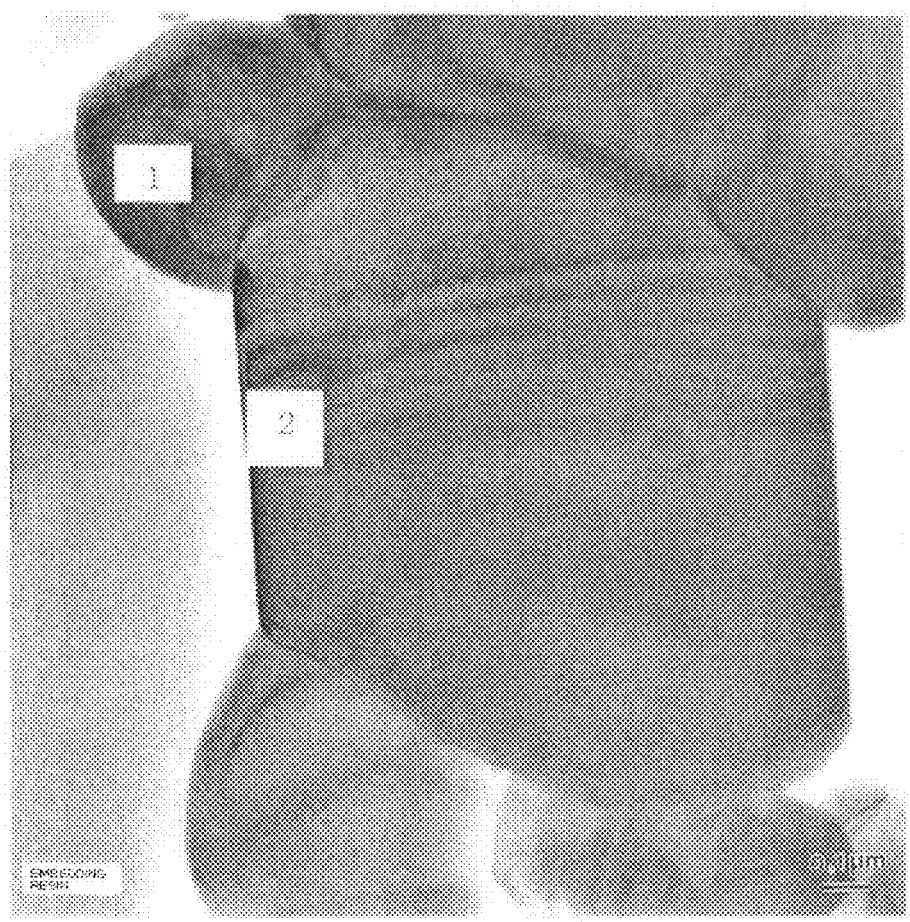

[FIG. 3]
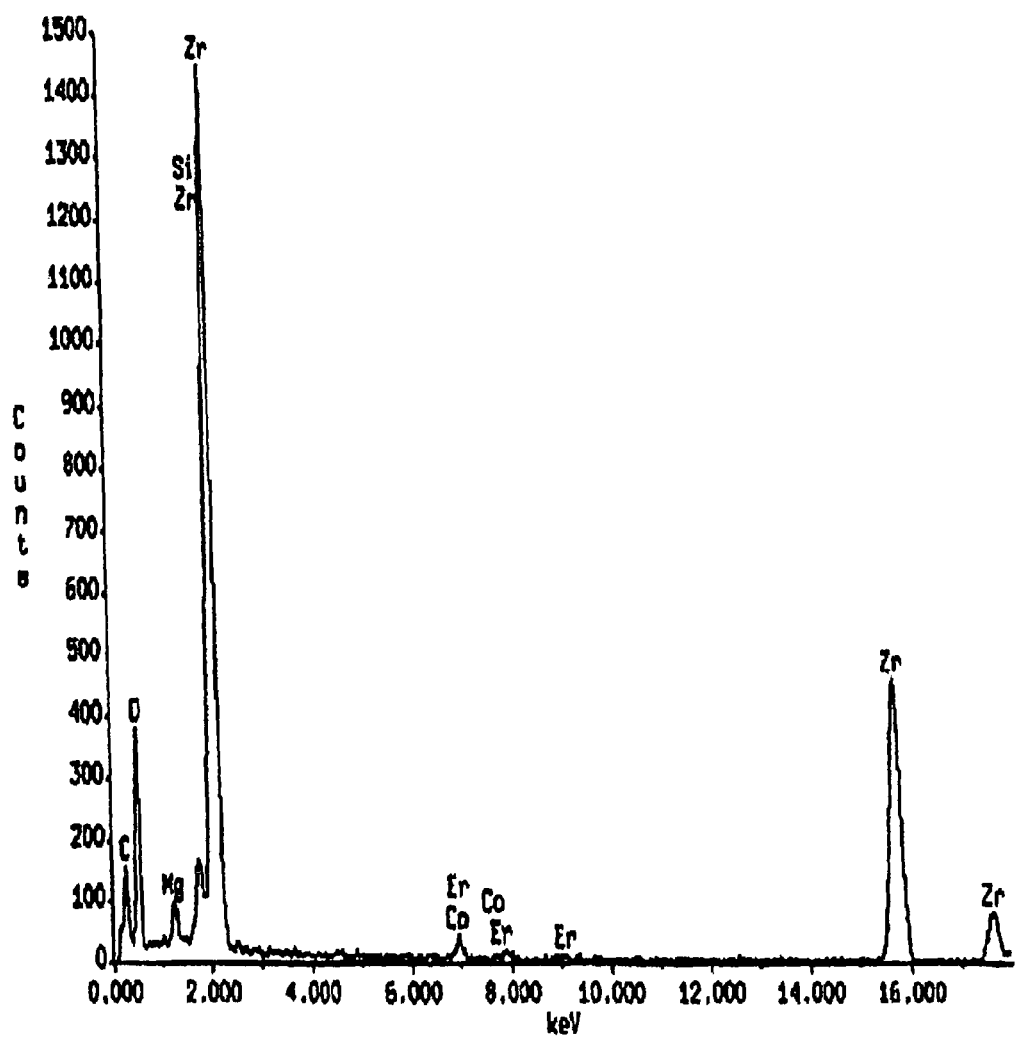

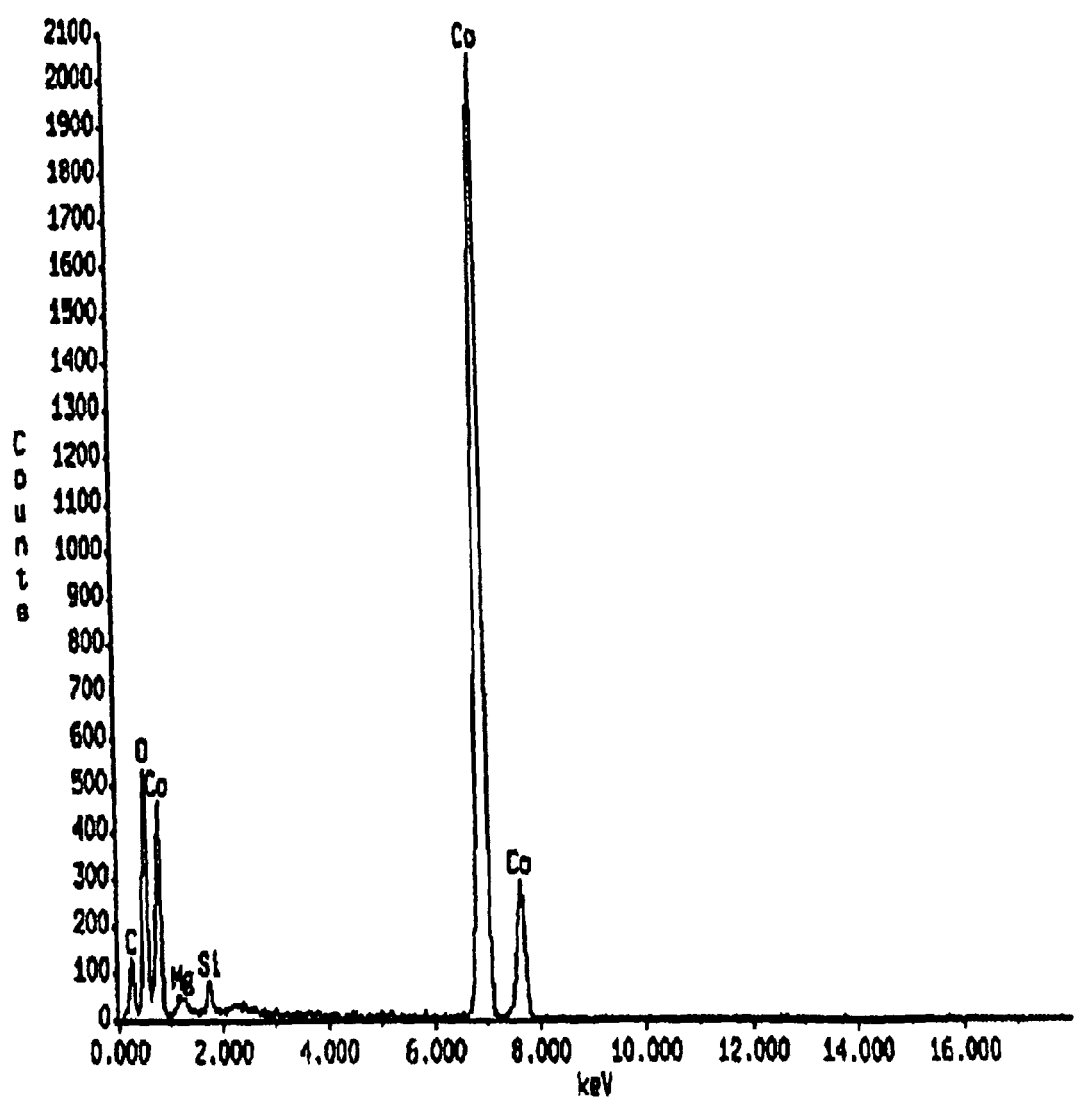
[FIG. 4]

NONAQUEOUS ELECTROLYTE SECONDARY BATTERY

This application is a continuation of application Ser. No. 10/594,459, filed Sep. 26, 2006, which is now U.S. Pat. No. 7,622,223, which is a 371 of international application PCT/JP2005/003723, filed Mar. 4, 2005, which claims priority based on Japanese Patent Application Nos. 2004-094475 and 2004-320394, filed Mar. 29, 2004, and Nov. 4, 2004, respectively, and which are incorporated herein by reference.

TECHNICAL FIELD

The present invention relates to a nonaqueous electrolyte secondary battery such as a lithium secondary battery.

BACKGROUND ART

In recent years, nonaqueous electrolyte secondary batteries using an alloy capable of storing and releasing lithium, metallic lithium or a carbon material as the negative active material and a lithium transition metal complex oxide represented by the chemical formula: $LiMO_2$ (M indicates a transition metal) as the positive active material have been noted as high-energy-density batteries.

A representing example of the lithium transition metal complex oxide is a lithium cobalt complex oxide ($LiCoO_2$), which has been already put to practical use as the positive active material for nonaqueous electrolyte secondary batteries.

For nonaqueous electrolyte secondary batteries using a lithium transition metal complex oxide, such as lithium cobaltate, as the positive active material and a carbon material or the like as the negative active material, an end-of-charge voltage is generally prescribed at 4.1-4.2 V. In this case, the active material of the positive electrode utilizes only 50-60% of its theoretical capacity. Accordingly, if the end-of-charge voltage is increased to a higher level, a capacity (utilization factor) of the positive electrode may be improved so that the battery capacity and energy density are increased.

However, the higher end-of-charge voltage renders $LiCoO_2$ more prone to experience structural degradation and increases a tendency of an electrolyte solution to decompose on a surface of the positive electrode. As a result, the battery in this case experiences marked deterioration with charge-discharge cycles, compared to the conventional case where the end-of-charge voltage is set at 4.1-4.2 V, which has been a problem.

Among the lithium transition metal complex oxides represented by $LiMO_2$ (M indicates a transition metal), those containing Mn and Ni as a transition metal, as well as materials containing all of the three transition metal elements Mn, Ni and Co, have been extensively studied (for example, Patent Literatures 1 and 2 and Non-Patent literature 1).

Among those lithium transition metal complex oxides containing Mn, Ni and Co, a compound having the same composition of Mn and Ni is reported as showing a uniquely high thermal stability even in a charged state (high oxidation state) (for example, Non-Patent Literature 2). It is also reported that the complex oxide having substantially the same composition of Ni and Mn has a voltage of approximately 4 V, as comparable to that of $LiCoO_2$, and exhibits a high capacity and a superior charge/discharge efficiency (Patent Literature 3).

Batteries using such a lithium transition metal complex oxide containing Mn, Ni and Co and having a layered structure as the positive active material, because of their high thermal stability at charged state, can be expected to achieve a marked reliability improvement even when the end-of-charge voltage is elevated to thereby increase the depth of charge at the positive electrode.

However, after the study on the battery using the lithium transition metal complex oxide containing Mn, Ni and Co as the positive active material, the inventors of this application have found that the higher end-of-charge voltage renders the positive active material more prone to experience structural degradation and increases the occurrence of decomposition of an electrolyte solution on a surface of the positive electrode and, as a result, the battery in this case shows marked capacity decline with charge-discharge cycles, compared to the conventional case where the end-of-charge voltage is set at 4.1-4.2 V.

Patent Literature 1: Patent Registration No. 2,561,556

Patent Literature 2: Patent Registration No. 3,244,314

Patent Literature 3: Patent Laying-Open No. 2002-42,813

Non-Patent Literature 1: Journal of Power Sources, 90 (2000), 176-181

Non-Patent Literature 2: Electrochemical and Solid-State Letters, 4(12), A200-A203 (2001)

Non-Patent Literature 3: $42^{nd}$ Battery Symposium in Japan, Lecture Summary, pp 50-51

DISCLOSURE OF THE INVENTION

It is an object of the present invention to provide a nonaqueous electrolyte secondary battery which can increase an end-of-charge voltage to 4.3 V or above without deterioration of charge-discharge cycle characteristics and thermal stability to thereby increase a charge-discharge capacity.

The nonaqueous electrolyte secondary battery of the present invention includes a positive electrode containing a positive active material, a negative electrode containing a negative active material and a nonaqueous electrolyte. Characteristically, the positive active material comprises a mixture of a lithium transition metal complex oxide A obtained by incorporating at least Zr and Mg into $LiCoO_2$ and a lithium transition metal complex oxide B having a layered structure and containing at least Ni and Mn as the transition metal.

Deterioration of charge-discharge cycle characteristics occurs when conventional $LiCoO_2$ is used as the positive active material and an end-of-charge voltage is increased to 4.3 V or above. Although the detailed cause is not clarified, it is presumably attributed to decomposition of the electrolyte solution by a catalytic action of cobalt when brought to a higher oxidation state on charge and to degradation of a crystal structure of $LiCoO_2$. The lithium transition metal complex oxide A in the present invention is believed to cause such a change in oxidation state of Co that suppresses decomposition of the electrolyte solution or degradation of crystal structure of $LiCoO_2$ by incorporation of Zr and Mg into $LiCoO_2$.

The lithium transition metal complex oxide A shows good charge-discharge cycle characteristics even when an end-of-charge voltage is increased, as described above. On the other hand, the lithium transition metal complex oxide B exhibits high thermal stability. In the present invention, such lithium transition metal complex oxides A and B are mixed to provide a positive active material which has the superior charge-discharge cycle characteristics of the lithium transition metal complex oxide A as well as the superior thermal stability of the lithium transition metal complex oxide B. Therefore, in accordance with the present invention, an end-of-charge voltage can be increased to 4.3 V or above without deterioration of charge-discharge cycle characteristics and thermal stability to thereby increase a charge-discharge capacity.

In the present invention, Zr exists preferably in the form of a compound adhered onto a surface of the lithium transition metal complex oxide A. That is, Zr is contained in the lithium transition metal complex oxide A, preferably in the form of a Zr compound adhered onto a surface of the lithium transition metal complex oxide A. Also preferably, the Zr compound exists in the form of particles adhered onto a surface of the lithium transition metal complex oxide A. It is believed that Zr adhered onto a surface of the lithium transition metal complex oxide A is not a contributor to stabilizing a crystal structure of the lithium transition metal complex oxide A, but instead facilitates transfer of lithium ions and electrons at the surface of the lithium transition metal complex oxide A during charge and discharge and, as a result, restrains oxidative decomposition of the electrolyte solution, which is a deterioration reaction.

It has been confirmed that Mg, when further added, diffuses into both of the Zr-containing compound and the lithium transition metal complex oxide A and enables the Zr-containing compound to be firmly sintered with the lithium transition metal complex oxide A. It is accordingly believed that addition of Mg improves adhesion between the Zr-containing compound and the lithium transition metal complex oxide A to result in a marked improvement of the effect that restrains decomposition of the electrolyte solution.

The lithium transition metal complex oxide A can be illustrated by a compound represented by a chemical formula: $Li_aCO_{1-x-y-z}Zr_xMg_yM_zO_2$ (in the formula, M is at least one element selected from Al, Ti and Sn, and a, x, y and z satisfy $0 \leq a \leq 1.1$, $x>0$, $y>0$, $z \geq 0$ and $0<x+y+z \leq 0.03$). When $z>0$, it is particularly preferred that M is Al.

The lithium transition metal complex oxide B preferably contains Co as the transition metal. Also preferably, it contains substantially the same amount of Mn and Ni. Mn, in its nature, is low in capacity but high in thermal stability at charged state, while Ni, in its nature, is high in capacity but low in thermal stability at charged state. To best balance their natures, Mn and Ni are preferably contained in the lithium transition metal complex oxide B in substantially the same amount.

The lithium transition metal complex oxide B can be illustrated by a compound represented by a chemical formula: $Li_bMn_sNi_tCo_uO_2$ (in the formula, b, s, t and u satisfy $0 \leq b \leq 1.2$, $s+t+u=1$, $0<s \leq 0.5$, $0<t \leq 0.5$ and $u \geq 0$).

The amount of the lithium transition metal complex A is preferably in the range of 51-90% by weight, more preferably in the range of 70-80% by weight, of the positive active material. Accordingly, the amount of the lithium transition metal complex oxide B is preferably in the range of 49-10% by weight, more preferably in the range of 30-20% by weight, of the positive active material. The battery exhibits superior charge-discharge cycle characteristics and thermal stability, if the above-specified ranges are met.

In the present invention, when intended to improve a battery capacity by increasing an end-of-charge voltage to a designed standard value, a ratio in charge capacity of the negative to positive electrode (negative electrode charge capacity/positive electrode charge capacity) in their portions opposed to each other is preferably kept within the range of 1.0-1.2. As such, if the ratio in charge capacity of the negative to positive electrode is kept at 1.0 or above, metallic lithium can be prevented from precipitating on a surface of the negative electrode. That is, when a battery is designed to be charged with an end-of-charge voltage of 4.3 V or 4.4 V, in either case, the ratio in charge capacity of the negative to positive electrode (negative electrode charge capacity/positive electrode charge capacity) in their portions opposed to each other is preferably kept within the range of 1.0-1.2. In this case, the negative active material is selected from materials other than metallic lithium. If the end-of-charge voltage goes beyond 4.4 V, the purposed effect that restrains decomposition of the electrolyte solution and retards degradation of the positive electrode may become insufficient. It is therefore preferred that the end-of-charge voltage does not exceed 4.4 V.

A nonaqueous electrolyte solvent for use in the present invention can be selected from those conventionally used as electrolyte solvents for lithium secondary batteries. Particularly preferred among them is a mixed solvent of a cyclic carbonate and a chain carbonate. Examples of cyclic carbonates include ethylene carbonate, propylene carbonate, butylene carbonate and vinylene carbonate. Examples of chain carbonates include dimethyl carbonate, methyl ethyl carbonate and diethyl carbonate. The inclusion of methyl ethyl carbonate as the chain carbonate is preferred for its ability to improve discharge characteristics of batteries.

In general, cyclic carbonates are susceptible to decomposition at a high potential. Therefore, when the battery is charged at a high voltage of 4.3 V or above, the cyclic carbonate content of the solvent is preferably kept within the range of 10-50% by volume. In the case where graphite material is used as the negative active material, ethylene carbonate (EC) is preferably used as the cyclic carbonate. However, ethylene carbonate is susceptible to decomposition at a high potential. In order to reduce the occurrence of decomposition at a high potential, ethylene carbonate may be replaced by propylene carbonate and/or butylene carbonate which is less susceptible to oxidative decomposition. Alternatively, the cyclic carbonate content of the mixed solvent may be lowered.

A nonaqueous electrolyte solute useful in the present invention can be selected from lithium salts generally used as a solute for lithium secondary batteries. Example of such lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. $LiPF_6$ (lithium hexafluorophosphate), among them, is preferably used. Charging at a higher voltage increases a tendency of aluminum, which is a positive current collector, to dissolve. However, $LiPF_6$, if present, decomposes to form on an aluminum surface a film which restrains dissolution of aluminum. Therefore, the use of $LiPF_6$ as the lithium salt is preferred.

Also in the present invention, the positive electrode may contain an electroconductor. In the case where a carbon material is used as the electroconductor, the carbon material is preferably contained in the amount of not greater than 5%, based on the total weight of the positive active material, electroconductor and binder. This is because the electrolyte solution becomes more susceptible to oxidative decomposition on a surface of the carbon material particularly when the battery is charged with a higher end-of-charge voltage.

The use of a mixture of the lithium transition metal complex oxide A obtained by incorporating at least Zr and Mg into $LiCoO_2$ and the lithium transition metal complex oxide B having a layered structure and containing at least Mn and Ni as the transition metal, in accordance with the present invention, enables the end-of-charge voltage to be increased to 4.3 V or above, without deterioration of charge-discharge cycle characteristics and thermal stability, and thereby increases a charge-discharge capacity of a nonaqueous electrolyte secondary battery.

BRIEF DESCRIPTION OF THE DRAWINGS

FIG. 1 is a photomicrograph (shown scale indicates 1 μm) showing an SEM reflection electron image of $LiCO_{0.99}Zr_{0.005}Mg_{0.005}O_2$.

FIG. 2 is a photomicrograph (shown scale indicates 0.1 μm) showing a TEM image of $LiCO_{0.99}Zr_{0.005}Mg_{0.005}O_2$.

FIG. 3 is a chart showing EDS results as measured at Spot 1 in FIG. 2.

FIG. 4 is a chart showing EDS results as measured at Spot 2 in FIG. 2.

BEST MODE FOR CARRYING OUT THE INVENTION

The present invention is below described in more detail by way of Examples. It will be recognized that the following examples merely illustrate the present invention and are not intended to be limiting thereof. Suitable changes can be effected without departing from the scope of the present invention.

Experiment 1

Example 1

Preparation of $LiCO_{0.99}Zr_{0.005}Mg_{0.005}O_2$ $Li_2CO_3$, $CO_3O_4$, $ZrO_2$ and MgO were mixed in a mortar such that a molar ratio Li:Co:Zr:Mg was brought to 100:99:0.5:0.5, heat treated in the air atmosphere at 850° C. for 24 hours and then pulverized to obtain $LiCo_{0.99}Zr_{0.005}Mg_{0.005}O_2$ having a mean particle diameter of about 14 μm.

Preparation of $LiMn_{0.33}Ni_{0.33}Co_{0.34}O_2$

LiOH and a coprecipitated hydroxide represented by $Mn_{0.33}Ni_{0.33}CO_{0.34}(OH)_2$ were mixed in a mortar such that a ratio in mole of Li to all transition metals was brought to 100:100. The mixture was heat treated in the air atmosphere at 1,000° C. for 20 hours and then pulverized to obtain $LiMn_{0.33}Ni_{0.33}Co_{0.34}O_2$ having a mean particle diameter of about 5 μm.

Fabrication of Positive Electrode

The obtained $LiCO_{0.99}Zr_{0.005}Mg_{0.005}O_2$ and $LiMn_{0.33}Ni_{0.33}Co_{0.34}O_2$ at a ratio by weight of 7:3 were mixed in a mortar to obtain a positive active material. Polyvinylidene fluoride as a binder was dissolved in N-methyl-2-pyrrolidone as a dispersing medium. Then, the positive active material and carbon as an electroconductor were added so that a ratio by weight of active material to electroconductor to binder was brought to 90:5:5. The resulting mixture was kneaded to prepare a cathode mix slurry. The prepared slurry was coated on an aluminum foil as a current collector, dried and then rolled by a pressure roll. Subsequent attachment of a current collecting tab completed fabrication of a positive electrode.

Fabrication of Negative Electrode

Synthetic graphite as the negative active material and a styrene-butadiene rubber as a binder were added to an aqueous solution of carboxymethylcellulose as a thickener so that the mixture contained the active material, binder and thickener in the ratio by weight of 95:3:2. The mixture was then kneaded to prepare an anode mix slurry. The prepared slurry was coated onto a copper foil as a current collector, dried and rolled by a pressure roll. Subsequent attachment of a current collecting tab completed fabrication of a negative electrode.

Preparation of Electrolyte Solution

Ethylene carbonate and diethyl carbonate were mixed at a 3:7 ratio by volume to provide a solvent in which $LiPF_6$ was subsequently dissolved in the concentration of 1 mole/liter to prepare an electrolyte solution.

Construction of Battery

The above-obtained positive and negative electrodes were wound, while interposing a separator between them, to provide a wound assembly. In a glove box maintained under Ar atmosphere, the wound assembly and electrolyte solution were encapsulated in an aluminum laminate to construct a nonaqueous electrolyte secondary battery A1 having a battery standard size of 3.6 mm in thickness, 3.5 cm in width and 6.2 cm in length.

The respective amounts of the positive and negative active materials used are adjusted such that, when a prescribed end-of-charge voltage is 4.4 V, a ratio in charge capacity of the negative to positive electrode (negative electrode charge capacity/positive electrode charge capacity) in their portions opposed to each other is 1.15. This ratio in charge capacity of the negative to positive electrode also applies to the following Examples and Comparative Examples.

Evaluation of Thermal Stability

The nonaqueous electrolyte secondary battery A1 at room temperature was charged at a constant current of 650 mA to a voltage of 4.45 V and further charged at a constant voltage of 4.45 V to a current value of 32 mA. The battery was then heated at a rate of 5° C./min from room temperature to a predetermined temperature. Subsequently, the battery was maintained at the predetermined temperature for 2 hours to evaluate its thermal stability.

Charge-Discharge Cycle Characteristics Evaluation

The nonaqueous electrolyte secondary battery A1 at room temperature was charged at a constant current of 650 mA to a voltage of 4.4 V, further charged at a constant voltage of 4.4 V to a current value of 32 mA and then discharged at a constant current of 650 mA until the voltage reached a predetermined value to thereby measure a discharge capacity (mAh) of the battery. This charge-discharge cycle was repeated to evaluate charge-discharge cycle characteristics.

Example 2

In Fabrication of Positive Electrode, $LiCo_{0.99}Zr_{0.005}Mg_{0.005}O_2$ and $LiMn_{0.33}Ni_{0.33}Co_{0.34}O_2$ were mixed at a ratio by weight of 8:2. Otherwise, the procedure of Example 1 was followed to construct a nonaqueous electrolyte secondary battery A2 and evaluate its thermal stability and charge-discharge cycle characteristics.

Example 3

Preparation of $LiCo_{0.978}Zr_{0.002}Mg_{0.01}Al_{0.01}O_2$

In Fabrication of Positive Electrode, $Li_2CO_3$, $CO_3O_4$, $ZrO_2$, MgO and $Al_2O_3$ were mixed in a mortar such that a molar ratio Li:Co:Zr:Mg:Al was 100:97.8:0.2:1.0:1.0, heat treated in the air atmosphere at 850° C. for 24 hours and then pulverized to obtain $LiCO_{0.978}Zr_{0.002}Mg_{0.01}Al_{0.01}O_2$ having a mean particle diameter of about 12 μm.

Construction of Battery $LiCO_{0.978}Zr_{0.002}Mg_{0.01}Al_{0.01}O_2$, as obtained above, and $LiMn_{0.33}Ni_{0.33}Co_{0.34}O_2$ were mixed at a ratio by weight of 7:3. Otherwise, the procedure of Example 1 was followed to construct a nonaqueous electrolyte secondary battery A3 and evaluate its thermal stability and charge-discharge cycle characteristics.

Example 4

In Fabrication of Positive Electrode, $LiCO_{0.99}Zr_{0.005}Mg_{0.005}O_2$ and $LiMn_{0.33}Ni_{0.33}Co_{0.34}O_2$ were mixed at a ratio by weight of 6:4. Otherwise, the procedure of Example 1 was followed to construct a nonaqueous electrolyte secondary battery A4 and evaluate its thermal stability and charge-discharge cycle characteristics.

Comparative Example 1

In Fabrication of Positive Electrode, $LiCO_{0.99}Zr_{0.005}Mg_{0.005}O_2$ alone was used as the positive active material. Otherwise, the procedure of Example 1 was followed to construct a nonaqueous electrolyte secondary battery X1 and evaluate its thermal stability and charge-discharge cycle characteristics.

Comparative Example 2

In Fabrication of Positive Electrode, $LiMn_{0.33}Ni_{0.33}Co_{0.34}O_2$ alone was used as the positive active material. Otherwise, the procedure of Example 1 was followed to construct a nonaqueous electrolyte secondary battery X2 and evaluate its thermal stability and charge-discharge cycle characteristics.

The thermal stability evaluation results for the nonaqueous electrolyte secondary batteries A1-A4 of Examples 1-4 and for the nonaqueous electrolyte secondary battery X1 of Comparative Example 1 are shown in Table 1. Also, the charge-discharge cycle characteristics evaluation results for the nonaqueous electrolyte secondary batteries A1-A4 of Examples 1-4 and for the nonaqueous electrolyte secondary batteries X1 and X2 of Comparative Examples 1 and 2 are shown in Table 2. In Table 2, a 100th-cycle discharge capacity and a 300th-cycle discharge capacity for each battery are listed in separate columns where capacity retention values, based on an initial discharge capacity, are also given in brackets.

TABLE 1

| Battery | Content of $LiMn_{0.33}Ni_{0.33}Co_{0.34}O_2$ in Positive Active Material | Thermal Stability 160° C. | 170° C. | 180° C. |
|---|---|---|---|---|
| Ex. 1 | A1 | 30% | — | Normal | Ignited |
| Ex. 2 | A2 | 20% | — | Normal | Ignited |
| Ex. 3 | A3 | 30% | — | Normal | Ignited |
| Ex. 4 | A4 | 40% | — | Normal | Ignited |
| Comp. Ex. 1 | X1 | 0% | Normal | Ignited | — |

TABLE 2

| | Battery | Content of $LiMn_{0.33}Ni_{0.33}Co_{0.34}O_2$ in Positive Active Material | Discharge Cutoff Voltage | Initial Discharge Capacity (mAh) | 100th-Cycle Discharge Capacity (mAh) | 300th-Cycle Discharge Capacity (mAh) |
|---|---|---|---|---|---|---|
| Ex. 1 | A1 | 30% | 3.1 V | 658.0 | 616.4 (93.7%) | 585.5 (89.0%) |
| Ex. 2 | A2 | 20% | 3.1 V | 666.6 | 620.4 (93.1%) | 591.1 (88.7%) |
| Ex. 3 | A3 | 30% | 3.1 V | 662.5 | 621.5 (93.8%) | 590.3 (89.1%) |
| Ex. 4 | A4 | 40% | 3.1 V | 694.4 | 651.3 (93.8%) | 536.1 (77.2%) |
| Comp. Ex. 1 | X1 | 0% | 2.75 V | 678.9 | 639.1 (94.1%) | 619.8 (91.3%) |
| Comp. Ex. 2 | X2 | 100% | 3.1 V | 552.7 | 461.7 (83.5%) | 274.3 (49.6%) |

As evident from comparison of the results of Examples 1-4 with those of Comparative Example 1 in Table 1, the battery using a mixture of the lithium transition metal complex oxide A and the lithium transition metal complex oxide B as the positive active material, relative to using the lithium transition metal complex oxide A alone, exhibits the improved thermal stability when it is charged to 4.45 V.

As also evident from comparison of the results of Examples 1-4 with those of Comparative Examples 1 and 2 in Table 2, the battery using a mixture of the lithium transition metal complex oxide A and the lithium transition metal complex oxide B as the positive active material, relative to using the lithium transition metal complex oxide B alone, exhibits the improved charge-discharge cycle characteristics when it is charged to 4.4 V. These demonstrate that the improved thermal stability and cycle characteristics both result from the use of a mixture of the lithium transition metal complex oxide A and the lithium transition metal complex oxide B.

As also shown in Table 2, the batteries of Examples 1-3, which use the positive active material containing 20-30% by weight of the lithium transition metal complex oxide B, exhibit particularly high capacity retention values after 300 cycles. This demonstrates that the use of the positive active material containing 70-80% by weight of the lithium transition metal complex oxide A and 30-20% by weight of the lithium transition metal complex oxide B further improves cycle characteristics.

As shown in Table 2, the batteries using the lithium transition metal complex oxide B were operated with discharge cutoff at a voltage of 3.1 V or above. This is because, even in the case where the prescribed end-of-charge voltage is 4.2V, if the discharge cutoff voltage is reduced to 2.9V or below, the use of the lithium transition metal complex oxide B causes marked deterioration of the battery with cycling (see Reference Experiment).

[Microscopic Observation]

$LiCo_{0.99}Zr_{0.005}Mg_{0.005}O_2$ used in Example 1 was observed with an electron microscope.

FIGS. 1 and 2 show an SEM reflection electron image and a TEM image of $LiCo_{0.99}Zr_{0.005}Mg_{0.005}O_2$, respectively. As can be seen from FIGS. 1 and 2, small particles adhere onto large particles.

Existing metal elements in the TEM image shown in FIG. 2 were qualitatively evaluated by EDS (energy dispersive spectroscopy). EDS measurement results are shown in FIGS. 3 and 4. FIG. 3 shows the EDS measurement results at Spot 1 in FIG. 2. FIG. 4 shows the EDS measurement results at Spot 2 in FIG. 2. As evident from FIGS. 3 and 4, Co is little detected but Zr is abundantly detected at Spot 1 in the TEM image shown in FIG. 2. On the other hand, Zr is not detected at all but Co is abundantly detected at Spot 2. These suggest that the adhering particle at Spot 1 comprises a Zr-containing compound, while the adhered particle at Spot 2 excludes Zr and comprises $LiCoO_2$. That is, the Zr compound particle adheres onto a surface portion of the $LiCoO_2$ particle and a major surface portion (at least 80%) of the $LiCoO_2$ particle is left exposed.

As also evident from FIGS. 3 and 4, Mg is detected both at Spot 1 and Spot 2. This therefore suggests that Mg is contained, through diffusion, both in the Zr compound particle and $LiCoO_2$ particle.

Experiment 2

Example 5

Similar to Fabrication of Positive Electrode in Example 1, $LiCO_{0.99}Zr_{0.005}Mg_{0.005}O_2$ and $LiMn_{0.33}Ni_{0.33}Co_{0.34}O_2$ at a ratio by weight of 7:3 were mixed to obtain a positive active material. As also similar to Example 1, a nonaqueous electrolyte secondary battery B1 was constructed using the positive active material. The procedure of Example 1 was further followed, except that the discharge cutoff voltage was changed to 2.75 V, to evaluate its charge-discharge cycle characteristics.

Example 6

Similar to Fabrication of Positive Electrode in Example 3, $LiCO_{0.978}Zr_{0.002}Mg_{0.01}Al_{0.01}O_2$ and $LiMn_{0.33}Ni_{0.33}Co_{0.34}O_2$ at a ratio by weight of 7:3 were mixed to obtain a positive active material. As also similar to Example 3, a nonaqueous electrolyte secondary battery B2 was constructed using the positive active material. The procedure of Example 3 was further followed, except that the discharge cutoff voltage was changed to 2.75 V, to evaluate its charge-discharge cycle characteristics.

[Evaluation of Charge-Discharge Cycle Characteristics of Batteries B1 and B2]

Each of the nonaqueous electrolyte secondary batteries B1 and B2, at room temperature, was charged at a constant current of 650 mA to a voltage of 4.4 V, further charged at a constant voltage of 4.4 V to a current value of 32 mA and then discharged at a constant current of 650 mA to a voltage of 2.75 V to measure a discharge capacity (mAh) of the battery. This charge-discharge cycle was repeated to evaluate charge-discharge cycle characteristics. The 100th-cycle discharge capacity was divided by the 1st-cycle discharge capacity to give a capacity retention rate at the 100th cycle.

Table 3 shows charge-discharge cycle characteristics of the batteries B1 and B2 as measured in the manner as described above.

TABLE 3

| Battery | Lithium Transition Metal Complex Oxide A | 100th-Cycle Capacity Retention |
|---------|------------------------------------------|-------------------------------|
| B1 | $LiCo_{0.99}Zr_{0.0005}Mg_{0.005}O_2$ | 89.0% |
| B2 | $LiCo_{0.978}Zr_{0.002}Mg_{0.01}Al_{0.01}O_2$ | 91.0% |

As evident from Table 3, under such conditions that the discharge voltage was set at 2.75 V, the nonaqueous electrolyte secondary battery B2 using a mixture containing a 7:3 ratio by weight of $LiCo_{0.978}Zr_{0.002}Mg_{0.01}Al_{0.01}O_2$ and $LiMn_{0.33}Ni_{0.33}Co_{0.34}O_2$ as the positive active material shows improved charge-discharge cycle characteristics, compared to the nonaqueous electrolyte secondary battery B1 using a mixture containing a 7:3 ratio by weight of $LiCO_{0.99}Zr_{0.005}Mg_{0.005}O_2$ and $LiMn_{0.33}Ni_{0.33}Co_{0.34}O_2$ as the positive active material. This is probably because further addition of a third different element, aluminum, to lithium cobaltate containing zirconium and magnesium further improves stability of the transition metal complex oxide A during charge-discharge cycles.

As such, the use of the lithium transition metal complex oxide A obtained by incorporating Zr, Mg and further M (M indicates Al, Ti or Sn) in $LiCoO_2$ improves charge-discharge cycle characteristics under such conditions that the discharge cutoff voltage is reduced to 2.75 V.

Experiment 3

In order to study the effect of the solvent type of the electrolyte solution on the discharge load characteristics for batteries using a mixture containing a 7:3 ratio by weight of $LiCO_{0.99}Zr_{0.005}Mg_{0.005}O_2$ and $LiMn_{0.33}Ni_{0.33}Co_{0.34}O_2$ as the positive active material, the batteries C1 and C2 distinguished from each other only by the type of the solvent used, as described below, were evaluated for discharge load characteristics.

Example 7

The procedure of Example 1 was fully followed to construct a nonaqueous electrolyte secondary battery C1 and evaluate its discharge load characteristics.

Example 8

In Preparation of Electrolyte Solution, ethylene carbonate and methyl ethyl carbonate were mixed at a 3:7 ratio by volume to provide a solvent in which $LiPF_6$ was subsequently dissolved in the concentration of 1 mole/liter to prepare an electrolyte solution. Otherwise, the procedure of Example 1 was followed to construct a nonaqueous electrolyte secondary battery C2 and evaluate its discharge load characteristics.

[Evaluation of Discharge Load Characteristics]

Each of the nonaqueous electrolyte secondary batteries C1 and C2, at room temperature, was charged at a constant current of 650 mA to a voltage of 4.4 V, further charged at a constant voltage of 4.4 V to a current value of 32 mA and then discharged at a constant current of 650 mA to a voltage of 2.75 V to measure a discharge capacity (mAh) of the battery. Thereafter, the battery was recharged using the above charging conditions and then discharged at a constant current of 2,600 mA to a voltage of 2.75 V to measure a discharge capacity (mAh) of the battery. The discharge capacity values measured under the respective conditions for the nonaqueous electrolyte secondary batteries C1 and C2 of Examples 7 and 8, as well as the load ratios calculated from the following equation, are shown in Table 4.

(Load ratio)=(discharge capacity when discharged at 2,600 mA)÷(discharge capacity when discharged at 650 mA)×100

TABLE 4

| Battery | Discharge Capacity at 650 mA (mAh) | Discharge Capacity at 2600 mA (mAh) |
|---|---|---|
| C1 | 688.1 | 587.2 (Load Ratio: 85.3%) |
| C2 | 690.5 | 644.7 (Load Ratio: 93.4%) |

As evident from Table 4, the nonaqueous electrolyte secondary battery C2 using methyl ethyl carbonate as a solvent for the electrolyte solution shows improved discharge load characteristics, compared to the nonaqueous electrolyte secondary battery C1 using diethyl carbonate. This is probably because the use of methyl ethyl carbonate, which is lower in viscosity than diethyl carbonate, as the solvent improves penetration of the electrolyte solution into the electrode and ionic conduction.

Reference Experiment

In order to study the effect of the discharge cutoff voltage on the cycle characteristics of batteries which use $LiMn_{0.33}Ni_{0.33}Co_{0.34}O_2$ alone as the positive active material, the following procedure was followed to construct batteries and evaluate their cycle characteristics when a prescribed end-of-charge voltage was 4.2 V.

[Construction of Reference Battery]

In Fabrication of Positive Electrode, $LiMn_{0.33}Ni_{0.33}Co_{0.34}O_2$ alone was used as the positive active material. Otherwise, the procedure of Example 1 was followed to construct nonaqueous electrolyte secondary batteries Y1, Y2 and Y3. The respective amounts of the positive and negative active materials were adjusted such that, when a prescribed end-of-charge voltage was 4.2 V, a ratio in charge capacity of the negative to positive electrode (negative electrode charge capacity/positive electrode charge capacity) was 1.15.

[Evaluation of Charge-Discharge Cycle Characteristics of Y1]

The nonaqueous electrolyte secondary battery Y1 at room temperature was charged at a constant current of 650 mA to a voltage of 4.2 V, further charged at a constant voltage of 4.2 V to a current value of 32 mA and then discharged at a constant current of 650 mA to a voltage of 3.1 V to thereby measure a discharge capacity (mAh) of the battery. This sequence of charge and discharge was repeated to evaluate charge-discharge cycle characteristics.

[Evaluation of Charge-Discharge Cycle Characteristics of Y2]

The nonaqueous electrolyte secondary battery Y2 at room temperature was charged at a constant current of 650 mA to a voltage of 4.2 V, further charged at a constant voltage of 4.2 V to a current value of 32 mA and then discharged at a constant current of 650 mA to a voltage of 2.9 V to thereby measure a discharge capacity (mAh) of the battery. This sequence of charge and discharge was repeated to evaluate charge-discharge cycle characteristics.

[Evaluation of Charge-Discharge Cycle Characteristics of Y3]

The nonaqueous electrolyte secondary battery Y3 at room temperature was charged at a constant current of 650 mA to a voltage of 4.2 V, further charged at a constant voltage of 4.2 V to a current value of 32 mA and then discharged at a constant current of 650 mA to a voltage of 2.75 V to thereby measure a discharge capacity (mAh) of the battery. This sequence of charge and discharge was repeated to evaluate charge-discharge cycle characteristics.

The cycle characteristics of Y1-Y3, as measured at room temperature in the manner as described above, are shown in Table 5.

TABLE 5

| Battery | Discharge Cutoff Voltage | 500th-Cycle Capacity Retention |
|---|---|---|
| Y1 | 3.1 V | 90.2% |
| Y2 | 2.9 V | 85.4% |
| Y3 | 2.75 V | 38.9% |

As evident from Table 5, the cycle characteristics show marked deterioration as the discharge cutoff voltage is reduced from 2.9 V to 2.75 V. Since the lithium transition metal complex oxide B having a layered structure and containing Mn and Ni, for use as the positive active material, exhibits a low initial charge-discharge efficiency with respect to the graphite negative electrode, the positive electrode potential drops considerably at a final stage of discharging of the battery. It is generally considered that Mn in compounds represented by $Li_aMn_bNi_bCo_{(1-2b)}O_2$ ($0 \leq a \leq 1.1$ and $0 < b \leq 0.5$) has an oxidation number of 4 ($Mn^{4+}$) and its oxidation state remains unchanged during charge and discharge (See, for example, Non-Patent Literature 3). However, when the positive electrode potential drops considerably, as described above, $Mn^{4+}$ in the positive electrode may be partly reduced to unstable $Mn^{3+}$ which undergoes a disproportionation reaction to produce $Mn^{4+}$ and $Mn^{2+}$. However, $Mn^{2+}$ is believed to elute from a surface of the positive electrode and precipitate on the negative electrode, because of its tendency to dissolve as it forms a complex with a solvent constituting an electrolyte solution. Presumably, such elution of Mn from a surface of the positive electrode causes degradation of crystal structure of the surface and, as a result, causes a resistance build-up at the positive electrode-electrolyte solution interface that deteriorates a capacity of the battery.

For the batteries using $LiMn_{0.33}Ni_{0.33}Co_{0.34}O_2$ in Examples of the present invention, a potential drop of the positive electrode at a final stage of discharging is suppressed by cycling them with 3.1 V discharge cutoff and, as a result, elution of Mn is restrained. This suppresses deterioration in capacity of the batteries and eliminates the influence of the discharge cutoff voltage on their room-temperature cycle characteristics.

The invention claimed is:

1. A nonaqueous electrolyte secondary battery which has a positive electrode containing a positive active material, a negative electrode containing a negative active material and a nonaqueous electrolyte comprising a mixed solvent of a cyclic carbonate and a chain carbonate, said secondary battery being characterized in that said positive active material comprises a mixture of a lithium transition metal complex oxide A obtained by incorporating at least Zr and Mg into $LiCoO_2$ and a lithium transition metal complex oxide B having a layered structure and containing at least Ni and Mn as the transition metal, the Zr contained in said lithium transition metal complex oxide A existing in the form of a compound adhered onto a surface of the lithium transition metal complex oxide A with at least 80% of the surface of said lithium transition metal complex oxide A being left exposed without being covered with said Zr compound.

2. The nonaqueous electrolyte secondary battery as recited in claim 1, characterized in that said lithium transition metal complex oxide A is represented by the chemical formula: $Li_aCo_{1-x-y-z}Zr_xMg_yM_zO_2$ (in the formula, M is at least one element selected from Al, Ti and Sn, and a, x, y and z satisfy $0 \leq a \leq 1.1$, $x>0$, $y>0$, $z \geq 0$ and $0<x+y+z \leq 0.03$).

3. The nonaqueous electrolyte secondary battery as recited in claim 1, characterized in that said Zr compound contained in said lithium transition metal complex oxide A exists in the form of particles adhered onto said surface of the lithium transition metal complex oxide A.

4. The nonaqueous electrolyte secondary battery as recited in claim 3, characterized in that said lithium transition metal complex oxide B is represented by the chemical formula: $Li_bMn_sNi_tCo_uO_2$ (in the formula, b, s, t and u satisfy $0 \leq b \leq 1.2$, $s+t+u=1$, $0<s \leq 0.5$, $0<t \leq 0.5$ and $u \geq 0$).

5. The nonaqueous electrolyte secondary battery as recited in claim 3, characterized in that said lithium transition metal complex oxide B contains substantially the same amount by mole of Mn and Ni.

6. The nonaqueous electrolyte secondary battery as recited in claim 3, characterized in that said positive active material contains 51-90% by weight of the lithium transition metal complex oxide A.

7. The nonaqueous electrolyte secondary battery as recited in claim 3, characterized in that said positive and negative active materials are contained such that, when a prescribed end-of-charge voltage is 4.3 V, a ratio in charge capacity of the negative to positive electrode is 1.0-1.2.

8. The nonaqueous electrolyte secondary battery as recited in claim 3, characterized in that said positive and negative active materials are contained such that, when a prescribed end-of-charge voltage is 4.4 V, a ratio in charge capacity of the negative to positive electrode is 1.0- 1.2.

9. The nonaqueous electrolyte secondary battery as recited in claim 1, characterized in that said lithium transition metal complex oxide B is represented by the chemical formula: $Li_bMn_sNi_tCo_uO_2$ (in the formula, b, s, t and u satisfy $0 \leq b \leq 1.2$, $s+t+u=1$, $0<s \leq 0.5$, $0<t \leq 0.5$ and $u \geq 0$).

10. The nonaqueous electrolyte secondary battery as recited in claim 9, characterized in that said lithium transition metal complex oxide B contains substantially the same amount by mole of Mn and Ni.

11. The nonaqueous electrolyte secondary battery as recited in claim 9, characterized in that said positive active material contains 51-90% by weight of the lithium transition metal complex oxide A.

12. The nonaqueous electrolyte secondary battery as recited in claim 9, characterized in that said positive and negative active materials are contained such that, when a prescribed end-of-charge voltage is 4.3 V, a ratio in charge capacity of the negative to positive electrode is 1.0-1.2.

13. The nonaqueous electrolyte secondary battery as recited in claim 9, characterized in that said positive and negative active materials are contained such that, when a prescribed end-of-charge voltage is 4.4 V, a ratio in charge capacity of the negative to positive electrode is 1.0-1.2.

14. The nonaqueous electrolyte secondary battery as recited in claim 1, characterized in that said lithium transition metal complex oxide B contains substantially the same amount by mole of Mn and Ni.

15. The nonaqueous electrolyte secondary battery as recited in claim 1, characterized in that said positive active material contains 51-90% by weight of the lithium transition metal complex oxide A.

16. The nonaqueous electrolyte secondary battery as recited in claim 1, characterized in that said positive and negative active materials are contained such that, when a prescribed end-of-charge voltage is 4.3 V, a ratio in charge capacity of the negative to positive electrode is 1.0-1.2.

17. The nonaqueous electrolyte secondary battery as recited in claim 1, characterized in that said positive and negative active materials are contained such that, when a prescribed end-of-charge voltage is 4.4 V, a ratio in charge capacity of the negative to positive electrode is 1.0- 1.2.

* * * * *